(12) United States Patent
Miller et al.

(10) Patent No.: US 9,665,245 B2
(45) Date of Patent: May 30, 2017

(54) BOOK COMBINING PHYSICAL AND DIGITAL MEDIA

(71) Applicants: Kristin Miller, Broomfield, CO (US); Lucas Miller, Broomfield, CO (US)

(72) Inventors: Kristin Miller, Broomfield, CO (US); Lucas Miller, Broomfield, CO (US)

( * ) Notice: Subject to any disclaimer, the term of this patent is extended or adjusted under 35 U.S.C. 154(b) by 0 days.

(21) Appl. No.: 14/640,643

(22) Filed: Mar. 6, 2015

(65) Prior Publication Data

US 2016/0259507 A1    Sep. 8, 2016

(51) Int. Cl.
  *G06F 17/21*  (2006.01)
  *G06F 3/0483*  (2013.01)
  *B42D 1/00*  (2006.01)

(52) U.S. Cl.
  CPC ............. *G06F 3/0483* (2013.01); *B42D 1/00* (2013.01)

(58) Field of Classification Search
  USPC ............. 235/462.15; 229/68.1; 434/317, 308
  See application file for complete search history.

(56) References Cited

U.S. PATENT DOCUMENTS

| | | | | |
|---|---|---|---|---|
| 5,520,544 A * | 5/1996 | Manico | .................. | G09B 5/062 281/31 |
| 7,020,663 B2 * | 3/2006 | Hay | ....................... | G06Q 30/06 434/317 |
| 7,557,939 B2 | 7/2009 | Marggraff | | |
| 8,011,122 B2 | 9/2011 | Clegg | | |
| 2003/0170604 A1 * | 9/2003 | Mullen | .................. | B42D 1/007 434/317 |
| 2007/0036609 A1 * | 2/2007 | Seymour | ................. | B42F 11/00 402/79 |
| 2007/0273951 A1 * | 11/2007 | Ribi | ...................... | B42D 15/022 359/237 |
| 2008/0043259 A1 * | 2/2008 | Triplett | ................ | H04N 1/3873 358/1.9 |
| 2009/0047992 A1 * | 2/2009 | Ortiz | ....................... | G06Q 10/06 455/552.1 |
| 2009/0191531 A1 | 7/2009 | Saccocci | | |
| 2010/0030566 A1 * | 2/2010 | Eisenberg | .......... | G06Q 30/0241 705/1.1 |
| 2011/0181624 A1 * | 7/2011 | Nugara | .................. | B42D 1/007 345/690 |
| 2012/0321272 A1 * | 12/2012 | Sikorski | ................ | H04N 5/765 386/224 |
| 2012/0327303 A1 * | 12/2012 | Sun | ....................... | G09G 3/3406 348/687 |
| 2014/0049714 A1 * | 2/2014 | Yoshida | .............. | G02F 1/13394 349/42 |
| 2015/0121177 A1 * | 4/2015 | Iida | ....................... | G06F 3/0483 715/201 |

\* cited by examiner

*Primary Examiner* — Allyson Trail
(74) *Attorney, Agent, or Firm* — Optima Law Group, APC; Timothy D. Simmons; Thomas E. Jurgensen (57) ABSTRACT

A book which simultaneously displays physical content and related digital media. The content and coordination of the digital and physical media will be established by the end user of the book. The book may display specific digital media via an electronic device in response to the selection of specific physical page.

8 Claims, 6 Drawing Sheets

BOOK COMBINING PHYSICAL AND DIGITAL MEDIA

STATEMENT REGARDING FEDERALLY FUNDED RESEARCH

This invention was not made under contract with an agency of the US Government, nor by any agency of the US Government.

CROSS-REFERENCE TO RELATED APPLICATIONS

N/A

FIELD OF INVENTION

This invention relates systems for interacting with and augmenting physical media with digital media.

BACKGROUND

People have long used scrapbooks, photo albums, and other such mementos to collect and preserve items of personal significance. While these objects are still functional, and enjoy wide use, they do not take full advantage of the increasing digital nature of our modern society. The ubiquity of digital cameras and camera equipped smart phones has led to a dramatic increase in the amount of personal, digital images and video that many people have in their possession. However, traditional memento books and journals are only able to display such images if a user chooses to print them out and attach them to the book.

Similarly, the digital images are often stored in large folders on a computer, phone, or tablet device. Even when these images are stored by date or event, it requires time to sort through a large volume of images to find the few that are truly relevant. Furthermore, the user is typically required to be seated in front of their device of choice in order to access these images or movies. Thus, if the files are stored on a computer or cell phone, it can be inconvenient to access a desired image if it is mixed in which a large number of other files. Furthermore, these images and video are not as readily accessed as pictures in a photo album. While devices such as digital picture frames partially alleviate this problem, they do not display images in any particular order, or in response to any cue. Instead, these devices merely cycle through preloaded images. Thus, the context that renders certain images "special" may not be readily evident.

Therefore, the aim of the present invention is to provide a book that will coordinate the display of physical media and digital media supplied by the end user of the book. By detecting the physical page that is currently on display, the book will be capable of displaying relevant digital media. Various methods of detecting the page to which a book is open are disclosed in U.S. Pat. Nos. 7,557,939, 8,011,122, and U.S. Patent application No. 2003/0170604.

SUMMARY OF THE INVENTION

The present invention is a novel book that combines the physicality of traditional print media with the versatility of more modern digital media. In certain embodiments, the book of the present application can enhance the functionality of traditional scrapbooks, photo albums, journals, diaries, or research logs.

One aspect of certain embodiments of the present invention is a novel book which is capable of simultaneously displaying digital media and physical media. Ideally, the book will synchronize the display of digital media that is related to the physical content of the book currently being displayed. In various embodiments, the digital media will be displayed in response to the selection of a specific page in the book. In more particular embodiments, the digital media will be associated with the content of the page selected. In yet more particular embodiments, the content of the physical page of the book is created or otherwise provided by the end user of the book, and the digital media to be displayed is created or otherwise provided by the end user.

In various embodiments of the present invention, the digital media is displayed via an electronic device attached to the book. The digital media includes, by way of example, digital imagery, digital video, and digital audio. In certain embodiments, the digital media is stored on the electronic device by an end-user of the book.

It is thus one aspect, advantage, objective and embodiment of the invention to provide a book for use by an end user, the book comprising: a first page and a second page; an electronic device comprising: non-volatile computer memory, and a processor unit; a video screen in communication with the processor unit; wherein the electronic device is attached to the book; wherein the video screen is visible regardless of which of the first page and the second page are displayed; wherein the electronic device stores a first media and a second media; wherein the first media and the second media are stored on the electronic device by such end user; wherein the first media is associated with a first content displayed on the first page; wherein the first content is provided by such end user; wherein the second media is associated with a second content displayed on the second page; wherein the second content is provided by such end user; and wherein the first media is displayed via the electronic device in response to the first page being selected and the second media is displayed on the electronic device in response to the second page being selected.

It is thus one aspect, advantage, objective and embodiment of the invention to provide such a book, wherein the electronic device further comprises: an audio output component in communication with the processor unit.

It is still another aspect, advantage, objective and embodiment of the invention to provide such a book, wherein the pages are removably attached to the book.

It is still another aspect, advantage, objective and embodiment of the invention to provide such a book, wherein the electronic device displays the media in high definition.

It is again still another aspect, advantage, objective and embodiment of the invention to provide such a book, further comprising a spine, wherein the spine comprises a hollow void.

It is thus another aspect, advantage, objective and embodiment of the invention to provide such a book, wherein the hollow void contains a cable having a first end and a second end, wherein the first end comprises a first connector that is compatible with a port present on an input/output module of the electronic device, and wherein the second end comprises a second connector.

It is still another aspect, advantage, objective and embodiment of the invention to provide such a book, further comprising a power supply unit, wherein the power supply unit comprises a port that is compatible with the second connector of the second end of the cable.

It is yet another aspect, advantage, objective and embodiment of the invention to provide such a book, wherein the spine further comprises a removable cover, wherein the removable cover provides access to the hollow void.

It is still another aspect, advantage, objective and embodiment of the invention to provide such a book, wherein the removable cover comprises the power supply unit.

It is thus one aspect, advantage, objective and embodiment of the invention to provide a memento comprising: a scrapbook having a spine, a front cover and a back cover both attached to the spine, a length, a width, and a plurality of pages attached to the scrapbook and disposed between the front and back covers; each page having a surface and having at least a first edge and having at least one backing layer; the scrapbook further having an electronic display device having a display face, the display face having a plurality of display pixels measured in respective first and second dimensions, the electronic display device being disposed between the front and back covers and with the display face oriented co-planer to the scrap book pages, the electronic display device being back lit; and a first portion of at least one scrap book page having a void therethrough, the electronic display device disposed so that the display face is visible through the void.

It is thus another aspect, advantage, objective and embodiment of the invention to provide a such a memento, wherein the plurality of scrapbook pages further comprise a flexible viewing layer attached to scrapbook pages.

It is yet another aspect, advantage, objective and embodiment of the invention to provide a such a memento, wherein the backing layer further comprises at least 80 pound paper stock, and wherein the viewing layer removably attaches to the backing layer paper stock.

It is still another aspect, advantage, objective and embodiment of the invention to provide a such a memento, further comprising a battery, a non-volatile computer memory, a processor unit, and an input/output connection, the battery operative to provide electrical current to the non-volatile computer memory, the processor unit, the input/output connection and the electronic display device, the computer processor unit operative to retrieve at least one media from the non-volatile computer memory and display the at least one media upon the electronic display device.

It is again another aspect, advantage, objective and embodiment of the invention to provide a such a memento, further comprising a power supply, the power supply operative to charge the battery.

It is still another aspect, advantage, objective and embodiment of the invention to provide a such a memento, wherein the power supply further comprises: a cable removably attached to the power supply, the cable having a first end, the first end having thereon an electrical connector.

It is yet another aspect, advantage, objective and embodiment of the invention to provide a such a memento, wherein the power supply comprises a cover, wherein the cover provides access to a hollow void present with the spine of the scrapbook.

It is thus another aspect, advantage, objective and embodiment of the invention to provide a such a memento, further comprising: page determination module, the processor unit responsive to the page determination module to select for display from among a plurality of media stored in the non-volatile computer memory.

DETAILED DESCRIPTION

The following description of embodiments of the present invention is designed to show examples, and should not be construed as limiting the invention in any way.

Provided herein is a description of a book (FIG. 1), that is capable of simultaneously displaying physical media and digital media to an end user, in which the physical content on the book page and the digital media on the device are provided and coordinated by the end user. In preferred embodiments and best modes presently contemplated of the present invention, the structure of the book comprises a front cover (101) and a back cover (102), which are hingedly attached to a spine (103). In alternate embodiments, the front cover (101) and the back cover (102) are hingedly attached to each other. In alternate embodiments the covers may be removably attached.

Figure 1:
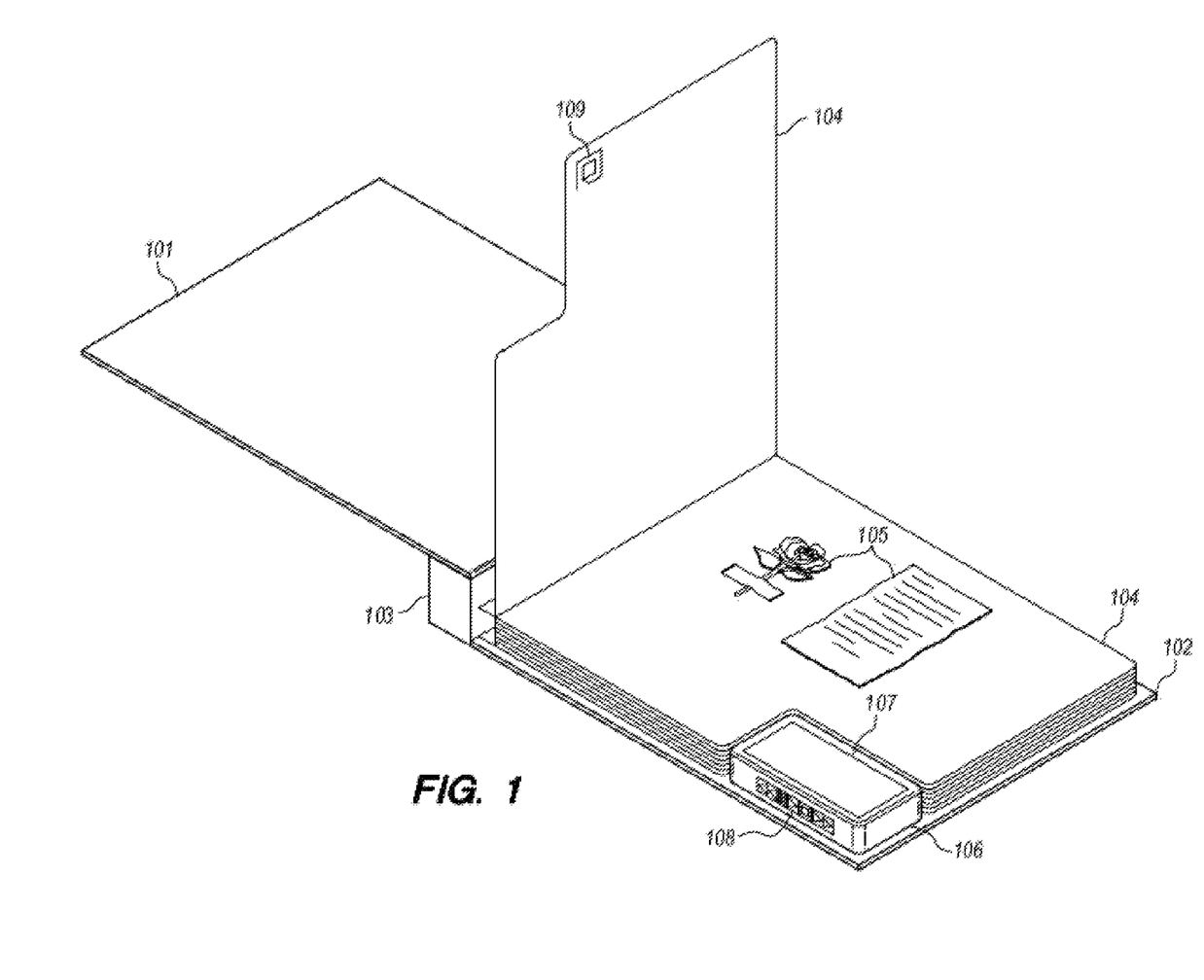
FIG. 1: An exemplary embodiment of the book of the present invention.
Figures 2A, 2B:
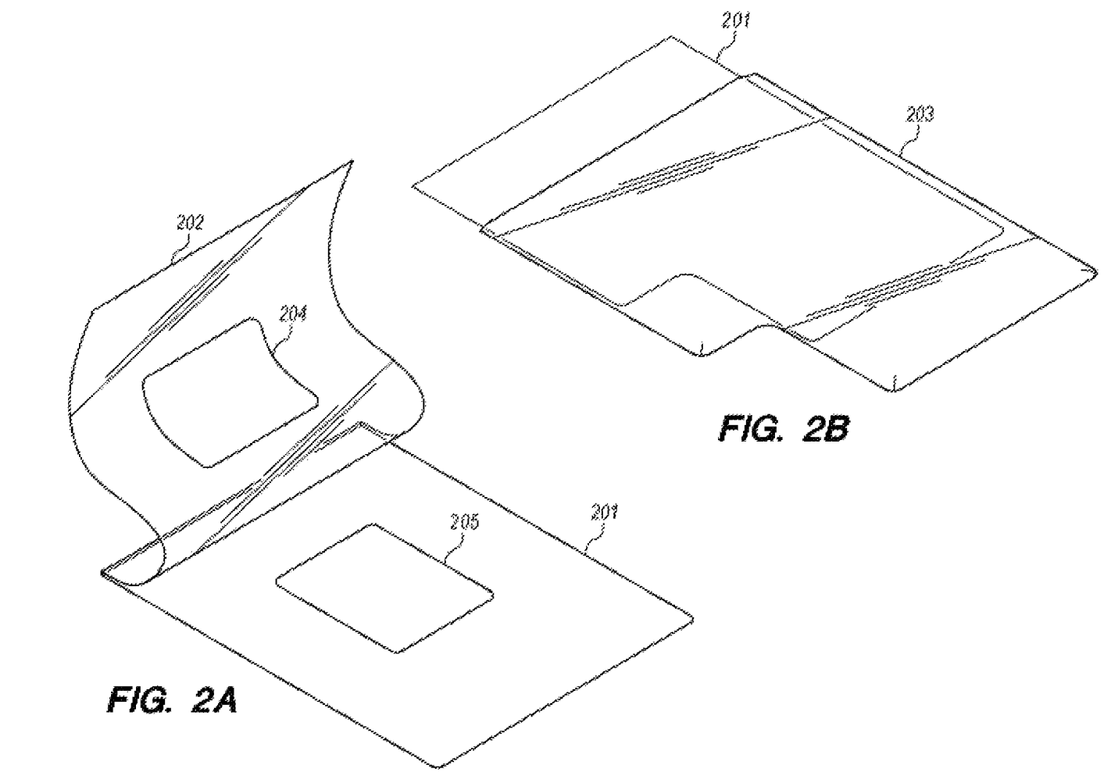
FIG. 2a: Illustration of a first potential embodiment of the protective viewing layer.
FIG. 2b: Illustration of a second potential embodiment of the protective viewing layer.

In various embodiments, pages (201) may be present within the book. In certain embodiments, the pages may be made of paper, while in other embodiments they may be made of a heavier card stock. The pages may serve as a backing layer, on which a user may display physical content. In more particular embodiments, the pages may be protected by a transparent and/or flexible viewing layer (202, 203). In some embodiments, the viewing layer (202) may be attached to one edge of the page (201). Preferably, the viewing layer (203) will be a removable sleeve. More preferably, this sleeve will be plastic and contoured to fit the shape of the page (201), or contain a gap or window (204) to correspond to with a gap present within the perimeter of the page (205). The pages (104) may be permanently attached to the book, or may be removable. Pages which are removable may be attached via binder rings, clamps, fasteners, or other means known in the art of bookbinding or later developed. The pages (104) may be configured to display physical content (105) provided by the user of the book. The term "removably attached" indicates both attachment and the fact that the user may end that attachment using the structures provided for the attachment.

Figure 3A:
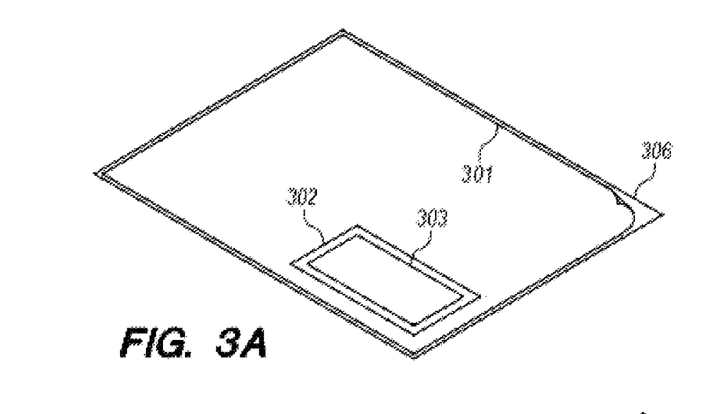
FIG. 3a: A first possible embodiment of the pages and electronic device.
Figure 3B:
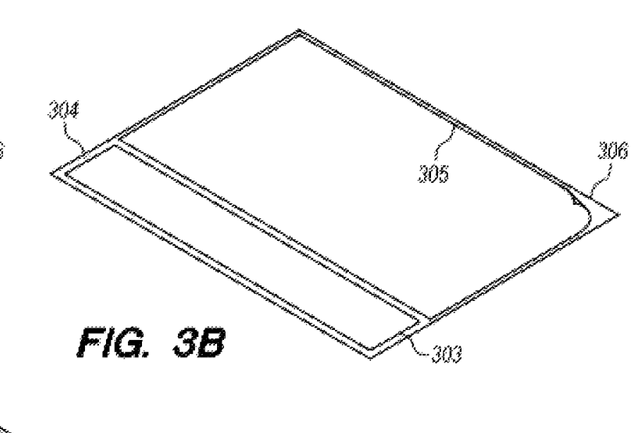
FIG. 3b: A second possible embodiment of the pages and electronic device.
Figure 3C:
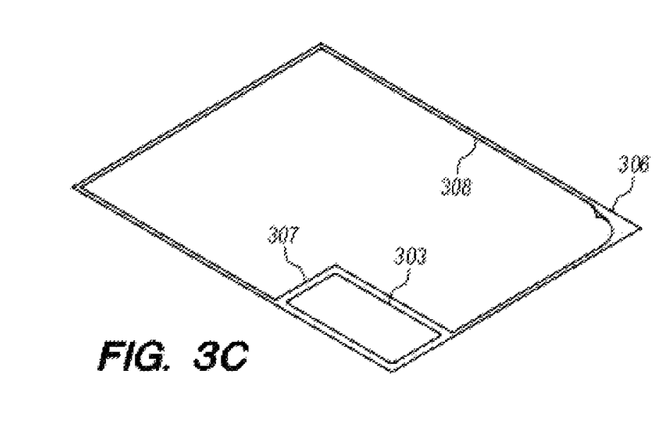
FIG. 3c: A third possible embodiment of the pages and electronic device.

In various embodiments, the pages will contain a void or gap through which an electronic device may be viewed. In certain embodiments, this void can be created by removing a portion of the page (301), thus creating a "window" (302) through which the display of the device (303) is visible. Alternately, this void (304) could be created by providing one or more pages (305) which have a length that is smaller in one or more dimensions than the cover (306) of the book. Preferably, the void (307) is created by providing a page (308) which will border the display of the electronic device (303), whereby the outer edges of the page and the display form a shape that is similar to that of the cover (306). It will be apparent to one having skill in the art that other possible page configurations will allow the device to be viewed regardless of which page is selected. A similar configuration may also be provided in the front cover of the book, thus allowing the electronic device to be visible even when the book is otherwise closed.

Figure 4:
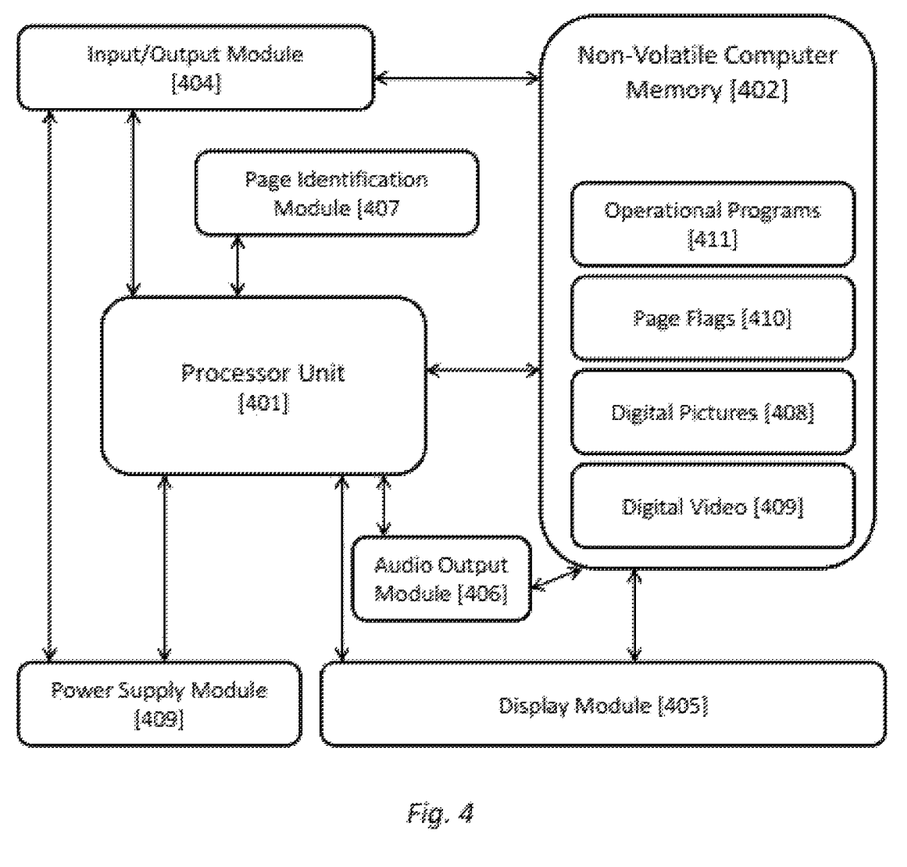
FIG. 4: Block diagram illustrating the workings of an embodiment of the electronic device.

The book will additionally contain an electronic device (106) that in certain embodiments is equipped with a processor unit (401), a non-volatile computer memory (402), and a power supply (403). The device may contain an input/output module (404), a display module (405), an audio output module (406), and a page identification module (407). In certain embodiments, each of the components may be contained within the housing of the electronic device. Alternately, such components may be contained elsewhere within the structure of the book, such as the spine (if any) or covers (if any), or special compartments, or special structures made for the purpose. Preferably, the electronic device will be attached to the book.

In various embodiments, the display module (405) may be a video screen which is capable of displaying or otherwise relating digital media. In certain embodiments the electronic device (106) will have a video screen (107) capable of displaying digital images (408) and video files (409). Preferably, the display face of this electronic display will be back-lit and capable of displaying high definition images. In certain embodiments the video screen will be touch-sensitive, allowing the user to control the electronic device by interacting with the video screen, for example by touching icons presented on the video screen. Additionally, physical buttons (108) may be provided by which a user may control certain functions of the electronic device.

Figure 5:
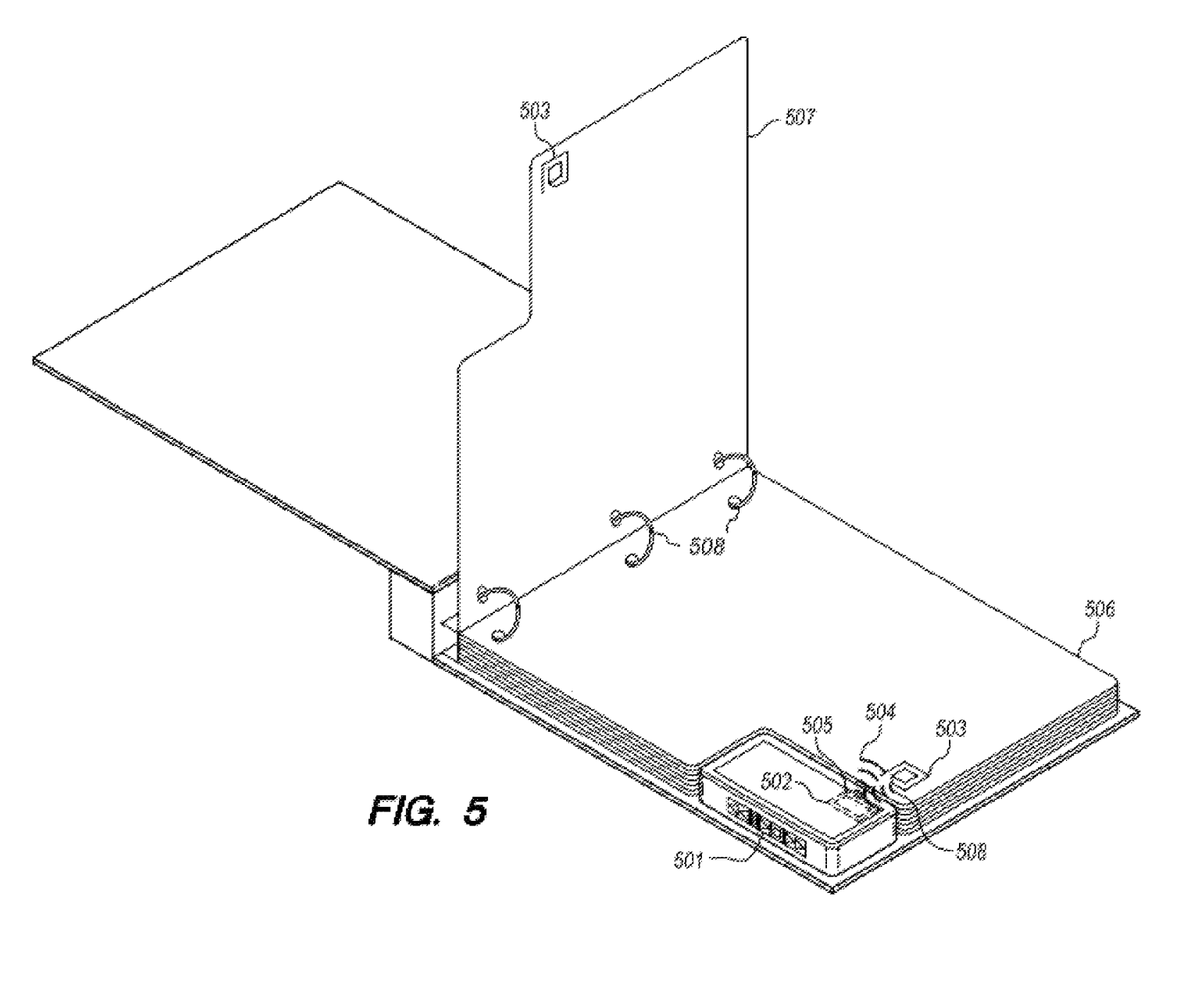
FIG. 5: An exemplary embodiment of the page identification module.

In preferred embodiments, the electronic device (501) will have the ability to determine which page has been selected by the user of the book. Therefore, the device may contain a page identification module (502) in communication with the processor unit of the device. This feature will enable the electronic device to display media that is relevant to the physical content of the page that is being viewed. Persons skilled in the art will appreciate that many possible means of determining the page selected by the user exist in the art or may be later developed, and additional methods are disclosed herein. Any specific embodiments of the page identification module below are meant to serve as examples, and not to limit the invention to the specifically enumerated embodiments.

In various embodiments, the page detection module could work by utilizing sliding tabs, light sensors attached to each page, or by scanning an embedded bar code (or similar computer readable code, such as a QR code or digital watermark) located on each page. Preferably, the module will determine the page via identification tags (503), such as radio frequency identification tags (RFID tags).

In certain embodiments, the identification tags are RFID tags (109). RFID tags may be active, semi-passive, and/or passive depending upon the application. Passive RFID tags do not maintain their own power supply, and are activated by an external wireless signal (504). Upon being activated by such a signal, the passive tag may transmit a portion of the energy it received as a multi-bit number (508). This transmission can then be received by a sensor/receiver (505) of an electronic device. The sensor/receiver may also be the component which transmitted the activating signal. The device can then employ various computer programs to decode the signal as well as determine the distance of the identification tag from the sensor/receiver. In certain embodiments, the RFID tags may be encoded in such a way that each tag corresponds to an individual page, allowing the electronic device to determine specifically which pages are presently located in proximity to the sensor/receiver. Alternately, the tag may not contain any specific page information, in which case the device would "count" the number of tags in proximity (506) to the sensor/receiver and the number of pages that distant or out of sensor range (507) and, using the total page number, extrapolate which page was currently being displayed. It will be apparent to those having skill in the art that other configurations making use of identification tags would allow the device to determine the page to which the book has been opened.

In other embodiments, the page identification module may make use of an optical sensor to identify the selected page. The sensor may be configured to read a bar code, QR code, digital watermark, or other such code displayed on the page. Alternately, the pages may contain a color code, allowing the sensor to determine the selected page by determining the hue of the page identification color being displayed. In yet another embodiment, the sensor may be configured to detect the actual content of the page itself. In certain embodiments, the sensor may require that the pages lay flat atop one another. Therefore, binding techniques that allow the pages to lay flat may be employed, such as with the use of binder rings (508).

Preferably, the electronic device will display digital content that is relevant to the content of the physical page. In one configuration, when a user stores digital media on the electronic device, the user can "flag" (410) the media as being related to the content of specific pages within the book. Then, when the device determines that the book has been opened to such a page, the device can display the digital media that has been flagged to that page.

Figure 6:
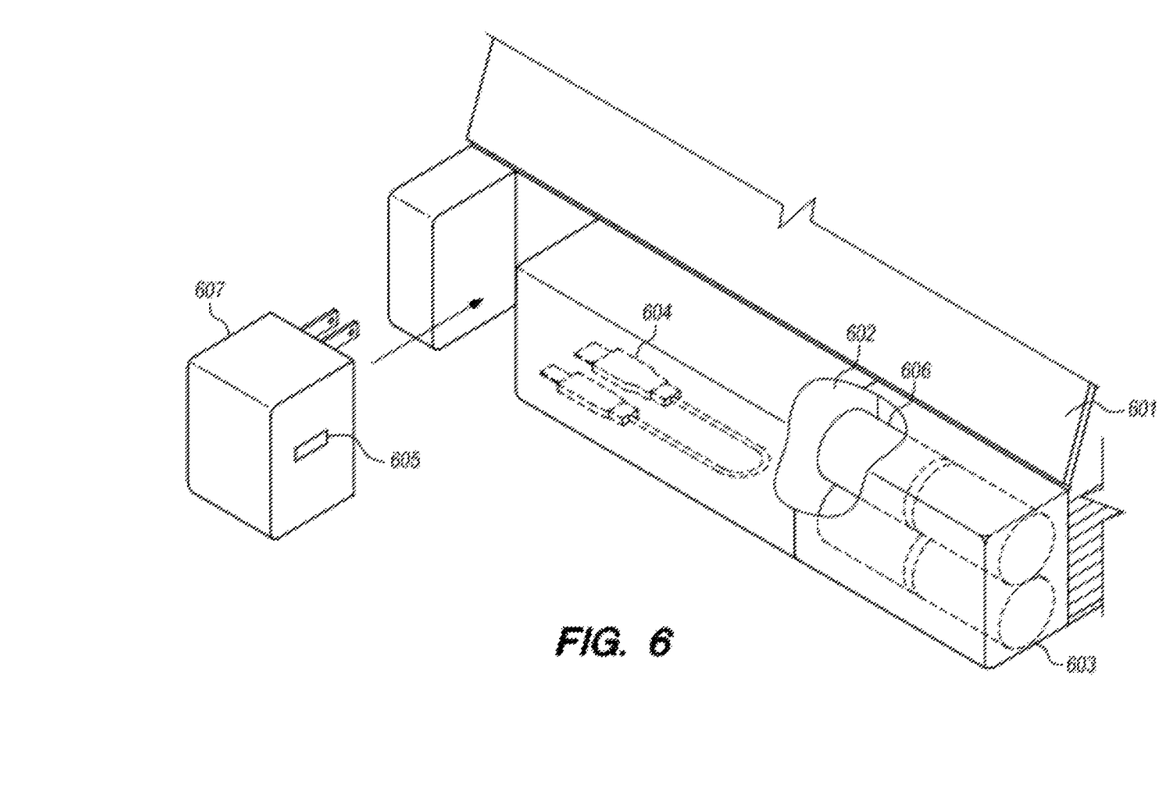
FIG. 6: An illustration of one embodiment wherein the spine contains a hollow void.

In certain embodiments, the book may house within its structure any loose or unattached components, such as those which may be used for charging the electronic device or for connecting the electronic device an external device, such as a computer. In one configuration, the book (601) may house these components within a hollow void (602) present in the spine (603) of the book. These components may include an electrical cable (604), a power supply unit (605), and a battery (606). The battery may be rechargeable via the electrical cable, or may be recharged via an external charging method. The hollow void may be accessed by way of a removable cover (607). Preferably, the power supply unit will also serve as the cover for the hollow void, as shown in FIG. 6. In certain configurations, the electrical cable (604) may have on one end a connector that is compatible with the input/output port on the electronic device. On the other end, the cable may have another connector, such as a USB connector, that is compatible with a port on the power supply unit or an external electronic device.

Working Example:

The following working example is designed to provide a detailed description of one potential embodiment of the present invention.

In this embodiment, a user of the invention wishes to remember certain key points of her life. As such, she has saved certain physical mementos related to the events as well as captured numerous photographs and videos with her digital camera. For example, she has saved the invitation to her son's wedding, as well as several high-quality photographs of the day. She also has several digital photographs of the reception as well as a video of the ceremony itself stored on her computer. She also has pictures drawn by two-year-old grandchild, as well as a digital video of the grandchild drawing the pictures.

Using the present invention, the user could affix the wedding invitation to one page of the book, and the hand-drawn pictures on a different page of the book. Using a charging and connection cable that is typically stored within a void in the spine of the book, the user connects the electronic device of the book to her personal computer. She is then able to transfer the digital pictures and video from the wedding to the electronic device, and flag that digital media as being related to the page on which she affixed the wedding invitation and wedding photos, thus associating them. Similarly, the user is able to transfer the digital video of her grandchild drawing the pictures to the electronic device and flag the video as being related to the content of the page on which the actual pictures are displayed. Once the digital and physical content has been added to the book, the user may do almost anything: store the book away for later viewing, lend or give the book to a special person, display the book, and so on and so forth.

When the user wishes to be reminded of the days in question, or when another user wishes to experience the book, she or the other user may make use of the book. By turning on the electronic device and opening the book to the page with the wedding, the device will determine which page is being shown, and display the digital media relevant to that page.

As such, it would display the digital pictures and video of the wedding ceremony that the user had flagged when she added the digital media to the device. When the user turns to the page with her grandchild's pictures, the device would again determine the page being shown and automatically display the video of the grandchild drawing the picture.

Glossary:

The term "digital media" refers to any media that is encoded in a machine readable format. Digital media includes, by way of example and not limitation, the following types of media formats: Images files, including JPG, TIFF, PNG, GIF, RAW, BMP, PSD, PSP, and other image file types known in the art or later developed; Video files, including AVI, FLV, WMV, MOV, MP4, and other video file formats known in the art or later developed; and Audio files, including MP3, VWA, WAV, RAM, MIDI, AIFF, and other audio formats known in the art or later developed. The term may include other types of media now known or later devised, including holographic image files, instruction files, 3D printer files, text files and so on. The digital media may be interactive and vary depending upon conditions in addition to page, such as user input, day, date, time, input from other optional sensors, and so on. More specifically, a user might record an audio and/or video record for others to experience, such as a memorial message, or might include a section of favored music, the sounds or ambience of a favored time, place or event, family photos and so on and so forth. In another context, digital media may refer to animated charts and graphs, PowerPoint™ slides, or videos showing experimental results.

The term "physical content" refers to objects which convey information to an end user and are tangible in nature. This category of media includes, but is not limited to, printed or hand-written information on paper, printed or hand-drawn pictures, and other physical objects. As an example, this media may refer to any physical object which has special meaning to the end user of the book, including such objects as pictures drawn by a child, a lock of hair, a flower, concert tickets or any other physical object that person may wish to save. In an example from another context, such physical content could be hand-written research notes, annotated charts and graphs, or other such content found in a laboratory notebook.

The term "content" in general may be either physical or digital content as defined above, and furthermore includes the aforementioned conveyance of meaning and information to the end user. Thus content may be memorabilia, reminiscence, person to person messages, literary or popular artistry and the like, according to the examples provided in previous paragraphs. It will be appreciated that the two types of content will create a synergy for those experiencing the book. The flexibility and potential storage space of digital content opens broad horizons for fiction, non-fiction and memorial type books, while the immediacy and impact of real objects, even objects as simple as 3-D pop-ups, ticket stubs to important events, pressed flowers, old love letters and the like carries a different type of emotional message. Though such content may be provided by the end user of the book, it need not be incorporated into the book by such end user. For example, the end user may transmit the pictures that the end user wishes to be displayed on the physical page to a third party, such as the seller of the book, to have the pictures professionally printed on the page. Similarly, the end user might instruct a third party to upload desired digital media files onto the electronic device and associate them with a certain page.

The term "associated" as used herein indicates most specifically that the CPU is able to provide a given piece of digital media in response to the opening of a particular page or part of the book, such as the front cover, table of contents, index, the first page, the second page and so on, each perhaps having the user's provided digital content in conjunction with the physical content at that location. More generally, the term indicates that two items are identified, usually in hardware or software, as having a linkage, which linkage can cause certain actions to occur regarding a second item/component/media when a certain condition or input is received from a first item/component/media.

The term "high definition" refers an image containing more than 480 pixels per image in one dimension. Standard high definition display resolutions include 480×640 pixels, 720×1280 pixels, 1080×1920 pixels, and 1256×1440 pixels. It is also evident that numerous other possible resolutions are capable of meeting the requirements of high definition, as the term is used in the art.

A "processor" is any component which is capable of controlling the operations of an electronic device. Such operations include, but are not limited to, the execution of computer programs, and the transfer of information from component of the electronic device to another. The functions of the processor may be contained within a single component, or distributed over many separate components, depending upon the configuration of the device.

A "non-volatile computer memory" is any electronic data storage medium that can retain its contents when not receiving power. This component may house the necessary programs to operate the electronic device (411) as well as any digital media that is stored on the electronic device.

A "power supply" is a component that receives electrical energy from a source and converts it into a form that is usable by the electronic device. In various configurations, the power supply can draw electrical current from an external source, such as an electrical outlet, and convert it into direct current, which can then be housed in a storage unit, such as a battery, or supplied directly to the components of the electronic device. The storage unit may be contained within the housing of the electronic device itself, or contained elsewhere within the structure of the book, such as in the spine. Preferably, the power supply will be a 120 volt transformer equipped with an electrical socket plug and a USB port, and may include a battery as the power supply or as part of the power supply rather than a separate unit.

The "input/output module" is a component of the electronic device that may allow the device to interact with other electronic devices or digital information storage devices. The module may comprise a cable or port configured to connect the electronic device of the book to an external electronic device, such as a computer, tablet device, or cellular phone. Such connections may make use of USB, FireWire, Ethernet, or other such electrical connectors. Furthermore, the module may comprise a wireless communication component, that utilizes signals such as WIFI, Bluetooth, or cellular signals that allows the electronic device of the book to communicate with external devices.

As used herein the term "in communication with" may refer to an operative relationship in which data and/or instructions and/or electrical energy may be transferred from one component or item to a second component or item. In some embodiments the transfer may be two way. For example, a battery may supply power to a CPU, an essentially one way transaction for a simpler battery, however, a touch-screen may receive data from the CPU and also send data to the CPU, thus making a two way communication. This communication may be wired, wireless, by occur by way of a bus or board, and may be direct or indirect.

The "audio output module" may be comprised of any component that is capable of rendering sound, such as music or speech.

Various book parts are given their ordinary meaning: a front cover and back cover are protective covers at either end of the collection of pages of a book, they may be hingedly attached sans spine or they may have a book spine. The book spine may be a normal book spine or it may have voids therein, and may include electronic devices such as power cords, batteries, data connectors and the like which are removably attached or partially removable, for example by uncoiling a cord or removing a battery. Pages, covers and video display devices may have lengths, widths, and depths as the terms are commonly understood and measured in units of length, and video display devices may have pixels (individual elements of color-changing ability) which pixels can be used to define the length and width of the video screen. All of these items may have edges at which they are measured, the term edge having its usual meaning.

Various electronic elements such as cables, ports, connectors and the like are also given their normal meanings: a cable is a long, flexible, electric current/data bearing device, a connector may be located at the end of a cable to allow its connection to another device, a port may accept such a connector. All of these may be customized or standard within the scope of the invention.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. Furthermore, the best known mode of practicing the claimed invention is present in the above description.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

We claim:
1. A memento comprising:
a scrapbook having a spine, a front cover and a back cover both attached to the spine, a length, a width, and a plurality of pages attached to the scrapbook and disposed between the front and back covers;
each page having a surface and having at least a first edge and having at least one backing layer;
the scrapbook further having an electronic display device having a display face, the display face having a plurality of display pixels measured in respective first and second dimensions, the electronic display device being disposed between the front and back covers and with the display face oriented co-planer to the scrapbook pages, the electronic display device being back lit; and
a first portion of at least one scrapbook page having a void therethrough, the electronic display device disposed so that the display face is visible through the void.

2. The memento of claim 1, wherein the plurality of scrapbook pages further comprise a flexible viewing layer attached to scrapbook pages.

3. The memento of claim 2, wherein the backing layer further comprises at least 80 pound paper stock, and wherein the viewing layer removably attaches to the backing layer paper stock.

4. The memento of claim 1, further comprising a battery, a non-volatile computer memory, a processor unit, and an input/output connection, the battery operative to provide electrical current to the non-volatile computer memory, the processor unit, the input/output connection and the electronic display device, the computer processor unit operative to retrieve at least one media from the non-volatile computer memory and display the at least one media upon the electronic display device.

5. The memento of claim 4, further comprising a power supply, the power supply operative to charge the battery.

6. The memento of claim 5, wherein the power supply further comprises: a cable removably attached to the power supply, the cable having a first end, the first end having thereon an electrical connector.

7. The memento of claim 5, wherein the power supply comprises a removable cover, wherein the cover provides access to a hollow void present with the spine of the scrapbook.

8. The memento of claim 4, further comprising: page determination module, the processor unit responsive to the page determination module to select for display from among a plurality of media stored in the non-volatile computer memory.

\* \* \* \* \*